(12) United States Patent
Whitehouse et al.

(10) Patent No.: US 6,953,825 B1
(45) Date of Patent: Oct. 11, 2005

(54) TREATED CARBONACEOUS COMPOSITIONS AND POLYMER COMPOSITIONS CONTAINING THE SAME

(75) Inventors: Robert S. Whitehouse, Lexington, MA (US); Jameel Menashi, Lexington, MA (US); Thomas F. Reed, Andover, MA (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 08/563,328

(22) Filed: Nov. 22, 1995

(51) Int. Cl.$^7$ ................................................. C08K 3/04
(52) U.S. Cl. ........................ 524/496; 524/495; 524/524; 524/557; 524/563
(58) Field of Search .............................. 524/495, 496, 524/557, 524, 563

(56) References Cited

U.S. PATENT DOCUMENTS

| | | | |
|---|---|---|---|
| 2,065,371 A | 12/1936 | Glaxner | 134/60 |
| 2,457,962 A | 1/1949 | Whaley | 260/766 |
| 2,511,901 A | 6/1950 | Bunn | 18/48 |
| 2,635,057 A | 4/1953 | Jordan | 106/307 |
| 2,639,225 A | 5/1953 | Venuto | 23/314 |
| 2,850,403 A | 9/1958 | Day | 106/307 |
| 2,908,586 A | 10/1959 | Braendle et al. | 106/307 |
| 2,922,773 A | 1/1960 | Coler et al. | 260/32.6 |
| 3,011,902 A | 12/1961 | Jordan | 106/307 |
| 3,014,810 A | 12/1961 | Dybalski et al. | 106/308 |
| 3,353,974 A | 11/1967 | Trimble et al. | |
| 3,361,702 A | 1/1968 | Wartman et al. | 260/33.2 |
| 3,429,958 A | 2/1969 | Walcott | |
| 3,464,949 A | 9/1969 | Wartman et al. | 260/32.6 |
| 3,565,658 A | 2/1971 | Frazier et al. | |
| 3,645,765 A | 2/1972 | Frazier et al. | |
| 3,844,809 A | 10/1974 | Murray | 106/307 |
| 3,969,295 A * | 7/1976 | Sunden et al. | 523/204 |
| 4,013,622 A | 3/1977 | DeJuneas et al. | |
| 4,035,265 A * | 7/1977 | Saunders | 252/510 |
| 4,041,002 A * | 8/1977 | Aboshi et al. | 524/503 |
| 4,102,967 A | 7/1978 | Vanderveen et al. | |
| 4,193,794 A * | 3/1980 | Metcalfe et al. | 430/137 |
| 4,230,501 A | 10/1980 | Howard et al. | |
| 4,277,288 A | 7/1981 | Lawrence et al. | |
| 4,305,849 A | 12/1981 | Kawasaki et al. | |
| 4,389,473 A * | 6/1983 | Scrutton et al. | 430/17 |
| 4,397,652 A | 8/1983 | Neumann | |
| 4,421,678 A * | 12/1983 | Mehta | 252/511 |
| 4,440,671 A | 4/1984 | Turbett | |
| 4,440,807 A | 4/1984 | Gunnell | |
| 4,444,948 A | 4/1984 | Hochstrasser et al. | |
| 4,480,026 A * | 10/1984 | Ashcraft et al. | 430/510 |
| 4,569,834 A | 2/1986 | West et al. | |
| 4,596,847 A * | 6/1986 | Kasuga et al. | 524/220 |
| 4,612,139 A | 9/1986 | Kawasaki et al. | |
| 4,749,612 A * | 6/1988 | Borkowski et al. | 428/246 |
| 4,812,505 A | 3/1989 | Topcik | |
| 4,873,282 A * | 10/1989 | Yui et al. | 524/496 |
| 4,933,012 A * | 6/1990 | Goetze et al. | 106/204 |
| 5,143,650 A * | 9/1992 | Gerace et al. | 252/511 |
| 5,164,265 A * | 11/1992 | Stubbs | 428/421 |
| 5,168,012 A | 12/1992 | Watson et al. | |
| 5,174,924 A * | 12/1992 | Yamada et al. | 252/511 |
| 5,212,222 A * | 5/1993 | Mitsuuchi et al. | 524/230 |
| 5,248,705 A * | 9/1993 | McGuigan et al. | 521/149 |
| 5,259,873 A * | 11/1993 | Fujioka | 106/20 C |
| 5,262,471 A * | 11/1993 | Akao | 524/496 |
| 5,306,739 A * | 4/1994 | Lucey | 522/42 |
| 5,517,003 A * | 5/1996 | Kadooka et al. | 219/548 |
| 5,589,531 A * | 12/1996 | Menashi et al. | 524/409 |
| 5,654,357 A * | 8/1997 | Menashi et al. | 524/496 |
| 5,747,559 A | 5/1998 | Whitehouse et al. | 523/205 |

FOREIGN PATENT DOCUMENTS

| | | | |
|---|---|---|---|
| CA | 0709008 | 5/1965 | ................... 400/60 |
| DE | 2723488 | 11/1978 | |
| GB | 975847 | 11/1964 | |
| GB | 2029421 | 3/1980 | ............ C08K/5/10 |
| JP | 51 144 430 | 12/1976 | ............ C09D/5/00 |
| JP | 5269950 | 6/1977 | |
| JP | 52-130481 | 11/1977 | |
| JP | 55165934 | 12/1980 | |
| JP | 5819811 | 2/1983 | ............ C08K/5/06 |
| JP | 61 118 499 | 6/1986 | ............ C11D/3/14 |
| JP | 61-145254 | 7/1986 | ......... C08L/101/00 |
| JP | 62 104 936 | 1/1987 | ............. B01J/2/06 |
| JP | 64-33163 | 2/1989 | ............ C09C/3/08 |
| JP | 1201369 | 8/1989 | ........... C09C/11/56 |
| JP | 4 164 901 | 6/1992 | ............. C08F/2/44 |
| RU | 937492 | 6/1982 | ............. C09C/1/52 |

OTHER PUBLICATIONS

International Search Report PCT/US96/00088, mailed Jun. 26, 1996.
ROC Patent Publication No. 272220 (Application No. 83110344), including amended claims filed Nov., 1995 (English translation provided).
Derwent Abstract for JP 61145254 A to Mitsubishi Gas Chem Co. Inc., Publication Date Jul. 2, 1986.
Derwent Abstract for JP 01–33163 A (JP 64–33163) to Nippon Soda Co., Publication Date Feb. 3, 1989.

* cited by examiner

Primary Examiner—Bernard Lipman

(57) ABSTRACT

Treated carbonaceous compositions comprising a carbonaceous material, preferably a carbon black, and an ester polymer treating agent. Also disclosed are polymer compositions incorporating the treated carbonaceous compositions and articles of manufacture formed from the polymer compositions.

27 Claims, No Drawings

TREATED CARBONACEOUS COMPOSITIONS AND POLYMER COMPOSITIONS CONTAINING THE SAME

BACKGROUND OF THE INVENTION

The present invention relates to treated carbonaceous compositions comprising a carbonaceous material, preferably a carbon black, treated with an ester polymer. The present invention also relates to polymeric compositions comprising the treated carbonaceous material and at least one polymer.

BACKGROUND OF THE ART

Carbonaceous materials include, but are not limited to, carbon black, graphite and carbon fibers.

Carbon blacks produced by a furnace process generally have bulk densities ranging from 0.02 to 0.1 gram/cubic centimeter (g/cc) and are generally known as fluffy carbon blacks. Fluffy carbon blacks are generally easy to disperse in liquids, and in some polymeric systems. However, fluffy carbon blacks are generally cohesive and, hence difficult to handle for purposes such as conveying and weighing.

Fluffy carbon blacks are agglomerated by various types of mechanical processes, either in the dry state, or with the aid of a liquid to produce pellets with improved handling characteristics. Common liquid pelletizing agents are oil and water. The process of agglomerating fluffy carbon blacks to form carbon black pellets is generally referred to as pelletizing.

Unfortunately, generally utilized densification or agglomeration (pelletizing) processes have detrimental effects on the dispersion characteristics of the carbon black. Therefore it is recognized in the art that in pelletizing carbon blacks there is a fine balance between acceptable handling characteristics and ease of dispersion.

A process for pelletizing carbon black is disclosed in U.S. Pat. No. 2,065,371 which describes a typical wet pelletization process whereby the fluffy carbon black and a liquid, typically water, are combined and agitated until spherical beads are formed. These beads are then dried to reduce the water content preferably to below 1% to form carbon black pellets.

Prior art patents also disclose the use of binder additives in a wet pelletization process to further improve the pellet handling characteristics.

The construction of insulated electrical conductors, i.e., wire and cables designed for medium and high voltage applications, is known in the art. Typical constructions include a core conductor which comprises one or more strands of a conducting metal or alloy such as copper or aluminum; a layer of a semiconductive shielding compound; a layer of insulation such as crosslinked polyethylene or ethylene-propylene rubber and a layer of a semiconductive insulation shield compound overlaying the insulation.

The conductor shield, the insulation shield and the overlaying semiconductive shield layer may be formed by either a two pass or by a single pass triple extrusion process. A two pass operation refers to a process whereby the conductor shield and the insulation layer are extruded in tandem and then crosslinked prior to extrusion of the semiconductor insulation layer. A single pass triple extrusion process refers to a process in which the conductor shield, the insulation layer and the semiconductive shield are all extruded in a common extrusion head and crosslinked simultaneously.

The single pass triple extrusion process minimizes production steps and hence is a preferred method of manufacture. However, the single pass triple extrusion process generally makes the semiconductive shield layer more fully bonded to the insulation layer, than in a two pass operation.

Generally, in order to splice insulated electrical wires, or make terminal connections, the semiconductive shield layer should be stripped from the insulation layer. Stripping the semiconductive shield layer from the insulation shield layer is often very difficult. In a situation where the semiconductive shield layer contains carbon black, a carbon containing residue on the surface of the insulation shield often results. The carbon residue may disadvantageously promote treeing in the insulation layer which will ultimately lead to electrical breakdown of the cable. It is therefore advantageous and desirable for a semiconductive shield layer to have a low strip force (be easily separable) when being removed from the insulation layer and for the semiconductive shield layer to leave minimal amounts of carbon residue on the surface of the insulation shield.

Strippable conductive shield compositions are those which can be separated from a crosslinked insulation layer without leaving appreciable amounts of residue on the insulation layer. Usually, the force required to separate a strippable conductive shield composition is significantly lower than the separation force required for bonded shield compositions.

There is a significant cost difference between strippable and bonded semiconductive shield compositions based on existing technological approaches. It would be advantageous, to produce more cost effective strippable formulations than those developed from the technical approaches utilized to date.

SUMMARY OF THE INVENTION

The present invention comprises treated carbonaceous compositions that in their dry form have improved handling characteristics and that impart enhanced performance characteristics to polymer compositions. Carbonaceous materials include, but are not limited to, carbon black, graphite and carbon fibers. The treated carbonaceous compositions comprise:

a carbonaceous material, preferably a carbon black, and
0.05% to 50%, by weight, based on the weight of the treated carbonaceous material of at least one ester polymer treating agent, comprising at least one monomer selected from at least one of the following groups:
  i) vinyl alcohol, or an ester of vinyl alcohol and a carboxylic acid containing from 1 to 20 carbon atoms;
  ii) acrylic acid or a $C_1$–$C_8$ alkyl ester of acrylic acid; or
  iii) methacrylic acid, or a $C_1$–$C_8$ alkyl ester of methacrylic acid.

Preferably the ester polymer treating agent further comprises ethylene, an alpha olefin or a vinyl aromatic monomer. More preferably the ester polymer treating agent is a polymer selected from one of the following groups:
  a) ethylene and vinyl acetate;
  b) ethylene and a $C_1$–$C_8$ alkyl ester of acrylic acid;
  c) styrene and a $C_1$–$C_8$ alkyl ester of acrylic acid; and
  d) ethylene, vinyl acetate and a $C_1$–$C_8$ alkyl ester of acrylic acid.

Suitable carbonaceous materials for use in the treated carbonaceous composition of the present invention include, but are not limited, to: carbon black, graphite and carbon fiber. The carbon black may be any carbon black such as a furnace carbon black, a thermal carbon black, an acetylene black, and a carbon black produced by a gasification process. While any carbon black may be utilized in the carbonaceous compositions of the present invention, especially preferred are carbon blacks having an iodine number ($I_2No.$) of 10 to 1800 mg/g and a fluffy dibutyl phthalate absorption value (DBP) of 40 to 350 cc/100 g.

The present invention also includes new polymer compositions comprising:
   a polymer component and
   0.5 to 74%, by weight, based on the weight of the polymer composition, of a treated carbonaceous composition comprising a carbonaceous material, preferably a carbon black, and 0.05% to 50%, by weight, based on the weight of the treated carbonaceous composition of at least one ester polymer treating agent, comprising at least one monomer selected from at least one of the following groups:
   i) vinyl alcohol, or an ester of vinyl alcohol and a carboxylic acid containing from 1 to 20 carbon atoms;
   ii) acrylic acid or a $C_1$–$C_8$ alkyl ester of acrylic acid; or
   iii) methacrylic acid, or a $C_1$–$C_8$ alkyl ester of methacrylic acid. The polymer compositions may include other conventional additives such as curing agents, processing additives, hydrocarbon oils, accelerators, coagents, antioxidants and the like.

Suitable carbonaceous materials for use in the polymer compositions of the present invention include, but are not limited, to: carbon black, graphite and carbon fiber, with carbon black being preferred.

Preferred treating agents for use in the polymer compositions of the present invention include the treating agents described above with reference to the treated carbonaceous compositions of the present invention.

White any polymer may be utilized in the polymer composition of the present invention, preferred polymers for use in the polymer compositions of the present invention include, but are not limited to:
   a) propylene homopolymers, ethylene homopolymers, and ethylene copolymers and graft polymers where the co-monomers are selected from butene, hexene, propene, octene, vinyl acetate, acrylic acid, methacrylic acid, $C_1$–$C_8$ alkyl esters of acrylic acid, $C_1$–$C_8$ alkyl esters of methacrylic acid, maleic anhydride, half ester of maleic anhydride, and carbon monoxide;
   b) elastomers selected from natural rubber, polybutadiene, polyisoprene, random styrene butadiene rubber (SBR), polychloroprene, acrylonitrile butadiene, ethylene propylene co and terpolymers, ethylene propylene diene monomer (EPDM); and
   c) homopolymers and copolymers of styrene, including styrene-butadiene-styrene linear and radial polymer, acrylonitrile butadiene styrene (ABS) and styrene acrylonitrile (SAN).

The polymer compositions of the present invention may be produced in any manner known to the art for combining polymers and particulate components.

A polymer composition of the present invention which may be advantageously utilized as a semiconductive composition for use in wire and cable applications comprises:
   25–55%, by weight, based on the weight of the polymer composition, of a treated carbonaceous composition of the present invention, preferably wherein the carbonaceous material is a carbon black;
   0 to 2%, by weight, based on the weight of the polymer composition, of a stabilizer
   0 to 2%, by weight, based on the weight of the polymer composition, of an antioxidant
   0 to 10%, by weight, based on the weight of the polymer composition, of a crosslinking agent;
   with the remainder being a polymer, or a blend, or mixture, of polymers, selected from the following group:
   an ethylene homopolymer;
   a propylene homopolymer;
   ethylene polymerized with one or more alpha olefins, such as propylene, butene, hexene or octene;
   ethylene polymerized with propylene and a diene monomer, preferably norbornene; and
   ethylene polymerized with one or more monomers selected from vinyl acetate, preferably comprising 16–45%, by weight of the ethylene vinyl acetate, of vinyl acetate monomer; acrylic acid; methacrylic acid; $C_1$–$C_8$ alkyl esters of acrylic acid; $C_1$–$C_8$ alkyl esters of methacrylic acid; maleic anhydride; or a monoester derived from fumaric or maleic acid, vinyl chloride or vinylidene chloride.

The polymer composition of the present invention may additionally include an additive polymer such as acrylonitrile butadiene elastomer preferably containing 25–55%, by weight acrylonitrile.

Suitable crosslinking agents for use in the polymer composition of the present invention include: organic peroxides, such as dicumyl peroxide; sulfur and sulfur donor systems. When the crosslinking agent utilized is an organic peroxide, the polymer composition of the present invention may further comprise: 0 to 10%, by weight, based on the weight of the polymer composition, of a vinyl silane.

A polymer composition of the present invention which may be advantageously utilized as a masterbatch formulation comprises:
   20–80%, by weight, based on the weight of the polymer composition, of a treated carbonaceous composition of the present invention, preferably wherein the carbonaceous material is a carbon black; and
   80–20%, by weight, based on the weight of the polymer composition, of at least one polymer selected from an ethylene homopolymer or copolymer, where the comonomer is preferably selected from hexene, propene, butene, octene, vinyl acetate, methyl acrylate, ethyl acrylate, butyl acrylate; propylene homopolymers or copolymers; or styrene homopolymers or copolymers including styrene-butadiene-styrene linear and radial polymer, acrylonitrile butadiene styrene (ABS) and styrene acrylonitrile (SAN).

Preferably, the ethylene homopolymer or copolymer is polyethylene, low density polyethylene, linear low density polyethylene, high density polyethylene or a polyethylene wax. The polymer composition may additionally include antioxidants, peroxide decomposers, hindered amine light stabilizers, substituted benzophenone UV adsorbers and/or processing aids.

The present invention further includes articles of manufacture produced from the polymer compositions of the present invention.

A preferred article of manufacture is an extruded article, such as a profile, tube, tape or film.

Also preferred as an article of manufacture of the present invention is a medium, or high, voltage cable comprising:
   a metal conductor core;
   a semiconductive shield;

an insulation layer; and an outer semiconductive layer, wherein a polymer composition of the present invention is utilized in the semiconductive shield and/or the outer semiconductive layer.

A polymer composition of the present invention advantageous for use as a masterbatch formulation, may be utilized to produce an article of manufacture comprising:

1 to 10%, preferably 2–5%, by weight, based on the weight of the article, of a polymer composition of the present invention; and 99 to 90%, preferably 9895%, by weight, based on the weight of the article, of a polymer.

The articles of manufacture of the present invention may be produced using conventional techniques utilized by those of ordinary skill in the art.

An advantage of the treated carbonaceous compositions of the present invention is that in dry form the treated carbonaceous compositions of the present invention have improved handling properties.

An advantage of the treated carbonaceous compositions of the present invention wherein the carbonaceous material is a carbon black is that in dry form the treated carbon blacks have improved handling properties in comparison with conventional fluffy or pelleted carbon blacks.

An advantage of the polymer compositions of the present invention is that the polymer compositions exhibit enhanced rheological, processing or mechanical properties.

Further advantages of the treated carbonaceous compositions, and the polymer compositions, of the present invention will become apparent from the following detailed description.

DETAILED DESCRIPTION OF THE INVENTION

The present invention includes treated carbonaceous compositions which in dry form have improved handling characteristics and impart enhanced performance characteristics to polymer compositions.

The treated carbonaceous compositions of the present invention comprise:

a carbonaceous material, preferably a carbon black, and 0.05% to 50%, preferably 0.5 to 20%, more preferably 1 to 10%, by weight, based on the weight of the treated carbonaceous material of at least one ester polymer treating agent, comprising at least one monomer selected from at least one of the following groups:

i) vinyl alcohol or an ester of vinyl alcohol and a carboxylic acid containing from 1 to 20 carbon atoms;

ii) acrylic acid or a $C_1$–$C_8$ alkyl ester of acrylic acid; or iii) methacrylic acid, or a $C_1$–$C_8$ alkyl ester of methacrylic acid.

Examples of an ester of vinyl alcohol and a carboxylic acid containing from 1 to 20 carbon atoms include, but are not limited to: vinyl acetate, vinyl proprionate and vinyl butyrate. Preferably the polymer treating agent further comprises ethylene, an alpha olefin or a vinyl aromatic monomer. More preferably the ester polymer treating agent is a polymer selected from one of the following groups:

a) ethylene and vinyl acetate;

b) ethylene and a $C_1$–$C_8$ alkyl ester of acrylic acid;

c) styrene and a $C_1$–$C_8$ alkyl ester of acrylic acid; and d) ethylene, vinyl acetate and a $C_1$–$C_8$ alkyl ester of acrylic acid.

Suitable carbonaceous materials for use in the treated carbonaceous composition of the present invention include, but are not limited, to: carbon black, graphite and carbon fiber. The carbon black may be any carbon black such as a furnace carbon black, a thermal carbon black, an acetylene black, and a carbon black produced by a gasification process. While any carbon black may be utilized in the carbonaceous compositions of the present invention, especially preferred are carbon blacks having an iodine number ($I_2$No.) of 10 to 1800 mg/g and a fluffy dibutyl phthalate absorption value (DBP) of 40 to 350 cc/100 g.

The treated carbonaceous compositions may be produced in any manner known in the art, such as by physically blending the components, melt mixing the components or combining the components while pelletizing the carbonaceous material.

When a carbon black is utilized as the carbonaceous material in the carbonaceous compositions of the present invention, the treated carbonaceous compositions are preferably produced by a pelletizing process by:

contacting a fluffy carbon black in a pin pelletizer with an aqueous dispersion containing an ester polymer treating agent selected from the foregoing groups of compounds; and heating the wet pellets under controlled temperature and time parameters such that the water is removed from the pellets but the ester polymer treating agent does not undergo substantial decomposition, and the final polymer treating agent level on the dry carbon black is from 0.05% to 50%, by weight based on the treated carbon black.

The present invention also includes new polymer compositions comprising:

a polymer component and 0.5 to 74%, by weight, based on the weight of the polymer composition, of a treated carbonaceous composition comprising a carbonaceous material, preferably a carbon black, and 0.05% to 50%, preferably 0.5 to 20%, more preferably 1 to 10%, by weight, based on the weight of the treated carbonaceous composition of at least one ester polymer treating agent, comprising at least one monomer selected from at least one of the following groups:

i) vinyl alcohol, or an ester of vinyl alcohol and a carboxylic acid containing from 1 to 20 carbon atoms;

ii) acrylic acid or a $C_1$–$C_8$ alkyl ester of acrylic acid; or iii) methacrylic acid, or a $C_1$–$C_8$ alkyl ester of methacrylic acid.

The polymer compositions may include other conventional additives such as curing agents, processing additives, hydrocarbon oils, accelerators, coagents, antioxidants and the like.

Suitable carbonaceous materials for use in the polymer compositions of the present invention include, but are not limited, to: carbon black, graphite and carbon fiber, with carbon black being preferred.

Preferred treating agents for use in the polymer compositions of the present invention include the treating agents described above with reference to the treated carbonaceous compositions of the present invention. Preferably the ester polymer treating agent further comprises ethylene, an alpha olefin or a vinyl aromatic monomer. More preferably the ester polymer treating agent is a polymer selected from one of the following groups:

a) ethylene and vinyl acetate;

b) ethylene and a $C_1$–$C_8$ alkyl ester of acrylic acid;

c) styrene and a $C_1$–$C_8$ alkyl ester of acrylic acid; and d) ethylene, vinyl acetate and a $C_1$–$C_8$ alkyl ester of acrylic acid.

While any polymer may be utilized in the polymer composition of the present invention, preferred polymers for use in the polymer compositions of the present invention include, but are not limited to:

a) propylene homopolymers, ethylene homopolymers, and ethylene copolymers and graft polymers where the co-monomers are selected from butene, hexene, propene, octene, vinyl acetate, acrylic acid, methacrylic acid, $C_1$–$C_8$ alkyl esters of acrylic acid, $C_1$–$C_8$ alkyl esters of methacrylic acid, maleic anhydride, half ester of maleic anhydride, and carbon monoxide;

b) elastomers selected from natural rubber, polybutadiene, polyisoprene, random styrene butadiene rubber (SBR), polychloroprene, acrylonitrile butadiene, ethylene propylene co and terpolymers, ethylene propylene diene monomer (EPDM); and c) homopolymers and copolymers of styrene, including styrene-butadiene-styrene linear and radial polymer, acrylonitrile butadiene-styrene (ABS)-and-styrene acrylonitrile (SAN).

The polymer compositions of the present invention may be produced in any manner known to the art for combining polymers and particulate components.

A polymer composition of the present invention which may be advantageously utilized as a semiconductive composition for use in wire and cable applications comprises:

25–55%, by weight, based on the weight of the polymer composition, of a treated carbonaceous composition comprising a carbonaceous material, preferably a carbon black, and 0.05% to 50%, preferably 0.5 to 20%, more preferably 1 to 10%, by weight, based on the weight of the treated carbonaceous composition of at least one ester polymer treating agent, comprising at least one monomer selected from at least one of the following groups:

i) vinyl alcohol, or an ester of vinyl alcohol and a carboxylic acid containing from 1 to 20 carbon atoms;

ii) acrylic acid or a $C_1$–$C_8$ alkyl ester of acrylic acid; or iii) methacrylic acid, or a $C_1$–$C_8$ alkyl ester of methacrylic acid;

0 to 2%, by weight, based on the weight of the polymer composition, of a stabilizer 0 to 2%, by weight, based on the weight of the polymer composition, of an antioxidant 0 to 10%, by weight, based on the weight of the polymer composition, of a crosslinking agent;

with the remainder being a polymer, or a blend, or mixture of polymers, selected from the following group:

an ethylene homopolymer;

a propylene homopolymer;

ethylene polymerized with one or more alpha olefins, such as propylene, butene, hexene or octene;

ethylene polymerized with propylene and a diene monomer, preferably norbornene; and ethylene polymerized with one or more monomers selected from vinyl acetate, preferably comprising 16–45%, by weight of the ethylene vinyl acetate, of vinyl acetate monomer; acrylic acid; methacrylic acid; $C_1$–$C_8$ alkyl esters of acrylic acid; $C_1$–$C_8$ alkyl esters of methacrylic acid; maleic anhydride; or a monoester derived from fumaric or maleic acid, vinyl chloride or vinylidene chloride.

Examples of an ester of vinyl alcohol and a carboxylic acid containing from 1 to 20 carbon atoms include, but are not limited to: vinyl acetate, vinyl proprionate and vinyl butyrate.

Preferably the ester polymer treating agent utilized in carbonaceous composition further comprises ethylene, an alpha olefin or a vinyl aromatic monomer. More preferably the ester polymer treating agent is a polymer selected from one of the following groups:

a) ethylene and vinyl acetate;

b) ethylene and a $C_1$–$C_8$ alkyl ester of acrylic acid;

c) styrene and a $C_1$–$C_8$ alkyl ester of acrylic acid; and d) ethylene, vinyl acetate and a $C_1$–$C_8$ alkyl ester of acrylic acid.

The polymer composition of the present invention may additionally include an additive polymer such as acrylonitrile butadiene elastomer preferably containing 25–55%, by weight acrylonitrile, based on the weight of the acrylonitrile butadiene elastomer.

Suitable crosslinking agents for use in the polymer composition of the present invention include: organic peroxides, such as dicumyl peroxide; sulfur and sulfur donor systems. When the crosslinking agent utilized is an organic peroxide, the polymer composition of the present invention may further comprise: 0 to 10%, by weight, based on the weight of the polymer composition, a vinyl silane.

A polymer composition of the present invention which may be advantageously utilized as a masterbatch formulation comprises:

20–80%, by weight, based on the weight of the polymer composition, of a treated carbonaceous composition comprising a carbonaceous material, preferably a carbon black, and 0.05% to 50%, preferably 0.5 to 20%, more preferably 1 to 10%, by weight, based on the weight of the treated carbonaceous composition of at least one ester polymer treating agent, comprising at least one monomer selected from at least one of the following groups:

i) vinyl alcohol, or an ester of vinyl alcohol and a carboxylic acid containing from 1 to 20 carbon atoms;

ii) acrylic acid or a $C_1$–$C_8$ alkyl ester of acrylic acid; or iii) methacrylic acid, or a $C_1$–$C_8$ alkyl ester of methacrylic acid; and 80–20%, by weight, based on the weight of the polymer composition, of at least one polymer selected from an ethylene homopolymer or copolymer, where the comonomer is preferably selected from hexene, propene, butene, octene, vinyl acetate, methyl acrylate, ethyl acrylate, butyl acrylate; propylene homopolymers or copolymers; or styrene homopolymers or copolymers including styrene-butadiene-styrene linear and radial polymer, acrylonitrile butadiene styrene (ABS) and styrene acrylonitrile (SAN).

Preferably, the ethylene homopolymer or copolymer is polyethylene, low density polyethylene, linear low density polyethylene, high density polyethylene or a polyethylene wax. The polymer composition may additionally include antioxidants, peroxide decomposers, hindered amine light stabilizers, substituted benzophenone UV adsorbers and/or processing aids.

Preferred ester polymer treating agents for use in the polymer composition of the present invention which may be advantageously utilized as a masterbatch formulation include the ester polymer treating agents referenced above with respect to the polymer compositions of the present invention and the treated carbonaceous materials of the present invention. Preferably the polymer treating agent further comprises ethylene, an alpha olefin or a vinyl aromatic monomer. More preferably the ester polymer treating agent is a polymer selected from one of the following groups:

a) ethylene and vinyl acetate;
b) ethylene and a $C_1$–$C_8$ alkyl ester of acrylic acid;
c) styrene and a $C_1$–$C_8$ alkyl ester of acrylic acid; and
d) ethylene, vinyl acetate and a $C_1$–$C_8$ alkyl ester of acrylic acid.

The present invention further includes articles of manufacture produced from the polymer compositions of the present invention.

A preferred article of manufacture is an extruded article, such as a profile, tube, tape or film.

Also preferred as an article of manufacture of the present invention is a medium, or high, voltage cable comprising:

a metal conductor core;
a semiconductive shield;
an insulation layer; and
an outer semiconductive layer, wherein a polymer composition of the present invention is utilized in the semiconductive shield and/or the outer semiconductive layer.

A polymer composition of the present invention advantageous for use as a masterbatch formulation, may be utilized to produce an article of manufacture comprising:

1 to 10%, preferably 2–5%, by weight, based on the weight of the article, of a polymer composition of the present invention; and 99 to 90%, preferably 98–95%, by weight, based on the weight of the article, of a polymer.

The articles of manufacture of the present invention may be produced using conventional techniques utilized by those of ordinary skill in the art.

The effectiveness and advantages of various aspects and embodiments of the present invention will be further illustrated by the following examples wherein the following testing procedures were utilized.

The following testing procedures were utilized in the determination and evaluation of the analytical properties of the carbon blacks utilized in the following examples. The DBP (dibutyl phthalate adsorption value) of the carbon blacks utilized in the examples, expressed as cubic centimeters DBP per 100 grams carbon black (cc/100 g), was determined according to the procedure set forth in ASTM D2414. The iodine number ($I_2$No.) of the carbon blacks utilized in the examples, expressed as milligrams per gram (mg/g), was determined according to ASTM test procedure D1510.

The peel force was determined by producing a plaque of the semiconductive composition utilizing a heated hydraulic press (temperature 130° C.) to produce 1.2 millimeters (mm) thick plaque. A 2 mm thick polyethylene plaque containing 1% dicumyl peroxide was produced in a similar manner. The two plaques were laminated together under a pressure of 100 psi and exposed to a curing cycle of 180° C. for 15 minutes. The resulting laminate was allowed to cool to ambient temperature under pressure. The strip force required to delaminate the composition layer from the polyethylene layer, at a peeling angle of 180° and a separation speed of 3.94 inches/minute was recorded as peel force. The error of the test is typically +/−0.1 lb/0.5 in.

The carbon blacks pellets described in the following examples were evaluated utilizing the following testing procedures. The pellets were assessed for mass pellet strength according to ASTM test procedure D1937.

The dispersion of the treated carbon black compositions was determined by extruding the compositions to form a tape and measuring the number and size of surface imperfections in the tape compositions using an optical microscope at 100x magnification and a reflected light source.

The effectiveness and advantages of the present invention will be further illustrated by the following examples.

EXAMPLE 1

Twenty seven polymer compositions, A-Z and AA, were produced utilizing three carbon blacks, CB1, CB2 and CB3 having the properties set forth in Table 1 below.

| Carbon Black | Iodine Number mg/g | Fluffy DBP cc/100 g |
|---|---|---|
| CB1 | 68 | 140 |
| CB2 | 43 | 142 |
| CB3 | 20 | 131 |

| Reference | Description |
|---|---|
| VINNAPAS EV 2 | ethylene, vinyl acetate copolymer emulsion solids content: 50% viscosity: 11000 +/− 4000 mPa · s particle size: 0.5–1.0 microns tensile strength: 0.3 N/mm2 elongation at break: 3000% glass transition temperature: −3° C. |
| VINNAPAS EP 17 | ethylene, vinyl acetate copolymer emulsion solids content: 60% viscosity: 3800 +/− 100 mPa · s particle size: 0.9 microns tensile strength: 6 N/mm2 elongation at break: 700% glass transition temperature: +3° C. |
| VINNAPAS LL 462 | ethylene, vinyl acetate copolymer emulsion approximately 44% ethylene solids content: 40% particle size: 0.3 microns tensile strength: 0.6 N/mm2 elongation at break: 1000% glass transition temperature: −27° C. |
| VINNAPAS LL 870 | ethylene, vinyl acetate copolymer emulsion approximately 43% ethylene solids content: 60% particle size: approx. 1 micron glass transition temperature: −26° C. |
| VINNAPAS EAF 60 | ethylene, vinyl acetate, acrylate emulsion solids content: 60% viscosity: 12000 +/− 4000 mPa · s particle size: 0.1–0.8 microns tensile strength: 0.4 N/mm2 elongation at break: 2500% |
| VINAMUL 32869 | ethylene, vinyl acetate copolymer emulsion approximately 3–5% ethylene solids content: 50% viscosity: 300 mPa · s particle size: 0.1–0.3 microns glass transition temperature: +10° C. |
| AIRFLEX 410 | ethylene, vinyl acetate copolymer emulsion solids content: 55% viscosity: 490 mPa · s glass transition temperature: +4° C. |

VINNAPAS is a registered trademark of Wacker GmbH.
VINAMUL is a registered trademark of Vinamul Ltd.
AIRFLEX is a registered trademark of Air Products and Chemicals, Inc.

The polymer compositions were produced by combining dry carbon black, with and without polymeric treating agent, using a Banbury mixer, with ELVAX EVA resins (manufactured and sold by DuPont Corporation, Wilmington, Del.) to produce compositions containing 40% by weight, based on the weight of the composition, of carbon black, 0.5% by weight, based on the weight of the composition, of AGERITE MA antioxidant (manufactured and sold by R. T. Vanderbilt Company Inc.), 1.0% by weight, based on the weight of the composition, of VUL-CUP R peroxide curing agent (manufactured and sold by Hercules Inc., Wilmington, Del.); the remainder being EVA resin and binder. The mixing temperature was maintained below 150° C. to minimize premature cure of the compound.

The peel force of each composition was then determined utilizing the procedure described above. The results are provided in Table 2 below

TABLE 2

| Comp. | Carbon Black | Treatment Type | Treatment Level % | ELVAXEVA Resin Grade | Peel Force lb/0.5 in |
|---|---|---|---|---|---|
| A | CB1 | none | — | 40L03 | 3.40 |
| B | CB1 | EV 2 | 2 | 40L03 | 3.15 |
| C | CB1 | EV 2 | 10 | 40L03 | 2.84 |
| D | CB1 | EP 17 | 2 | 40L03 | 2.92 |
| E | CB1 | LL 870 | 2 | 40L03 | 3.15 |
| F | CB1 | LL 462 | 2 | 40L03 | 2.52 |
| G | CB1 | LL 462 | 10 | 40L03 | 2.76 |
| H | CB1 | EAF 60 | 2 | 40L03 | 2.20 |
| I | CB1 | A 410 | 2 | 40L03 | 3.27 |
| J | CB1 | 32869 | 2 | 40L03 | 3.17 |
| K | CB1 | none | — | 170 | 4.54 |
| L | CB1 | LL 462 | 2 | 170 | 3.16 |
| M | CB1 | LL 870 | 2.6 | 170 | 2.70 |
| N | CB1 | EAF 60 | 2 | 170 | 3.84 |
| O | CB1 | EAF 60 | 10 | 170 | 3.10 |
| P | CB1 | none | — | 265 | 7.80 |
| Q | CB1 | LL 462 | 2 | 265 | 6.23 |
| R | CB1 | EAF 60 | 2 | 265 | 6.90 |
| S | CB2 | none | — | 170 | 4.75 |
| T | CB2 | LL 870 | 4 | 170 | 3.72 |
| U | CB2 | EAF 60 | 2 | 170 | 4.16 |
| V | CB2 | EAF 60 | 4 | 170 | 4.01 |
| W | CB2 | EAF 60 | 10 | 170 | 3.81 |
| X | CB3 | none | — | 40L03 | 4.54 |
| Y | CB3 | LL 462 | 0.5 | 40L03 | 3.47 |
| Z | CB3 | LL 462 | 2 | 40L03 | 3.16 |
| AA | CB3 | LL 462 | 4 | 40L03 | 2.96 |

Table 2 demonstrates the beneficial effect on reducing the strip force using treated carbon black compositions. This effect is noticeable for different polymeric binder compositions, different binder loading and different vinyl acetate containing EVA resins.

EXAMPLE 2

This example illustrates the improved strength performance of the treated carbonaceous compositions of the present invention, utilizing carbon black as the carbonaceous material, as compared to untreated carbon black pellets.

Eleven carbon black pellet compositions, BB-LL were produced utilizing CB1 from Example 1 above. Carbon black pellets compositions CC-LL were treated carbon black compositions of the present invention. Carbon black composition BB was a control carbon black pellet composition produced without a treating agent. Twenty samples of each carbon black pellet composition were produced for further evaluation.

Carbon black pellets were produced by combining the fluffy carbon black with an ester polymer emulsion, if utilized, and water, to form wet pellets, in a continuous pin pelletizer. The resultant wet pellets were dried at a temperature which was sufficient to remove the water without causing decomposition of the polymer. In these experiments, drying temperatures in the range of 120° to 180° C. were found to be acceptable.

The ester polymer emulsions utilized were VINNAPAS LL 462 ethylene, vinyl acetate copolymer emulsion; VINNAPAS LL 870 ethylene, vinyl acetate copolymer emulsion; and VINNAPAS EAF 60 ethylene, vinyl acetate, acrylate emulsion; having the properties described in Example 1.

Each of the carbon black pellets were then tested for mass pellet strength utilizing the procedure described above. The results are provided in Table 3.

TABLE 3

Carbon Black Pellet Strength

| Carbon Black Pellet Composition | VINNAPAS Polymer Emulsion Grade | %, by weight of polymer emulsion | Mean Pellet Strength (grams) | Standard Deviation |
|---|---|---|---|---|
| BB | none | 0 | 12.2 | 3.5 |
| CC | LL 462 | 2 | 19.6 | 4.7 |
| DD | LL 462 | 5 | 27.6 | 5.3 |
| EE | LL 462 | 8.9 | 33.1 | 4.2 |
| FF | LL 462 | 13.3 | 39.0 | 7.8 |
| GG | LL 870 | 2.6 | 24.6 | 4.2 |
| HH | LL 870 | 4 | 46.0 | 10.6 |
| II | EAF 60 | 2 | 16.8 | 3.7 |
| JJ | EAF 60 | 4 | 19.5 | 3.0 |
| KK | EAF 60 | 6.7 | 25.9 | 3.9 |
| LL | EAF 60 | 10 | 31.5 | 6.3 |

The results illustrate that carbon black pellet compositions of the present invention, produced utilizing an ester polymer treating agent, have enhanced pellet strength in comparison to a control carbon black pellet produced without treating agent. One of ordinary skill in the art would expect that the enhancement in strength would result in the carbon black pellet compositions of the present invention having less pellet attrition during conveying and transportation, resulting in fewer dust handling problems in subsequent process operations.

EXAMPLE 3

This example illustrates the improved dispersion characteristics exhibited by ester polymer treated carbonaceous compositions of the present invention in polymer compositions.

Five polymer compositions, MM-QQ were produced utilizing carbon black CB1 described in Example 1. Carbon black pellets were produced by combining the fluffy carbon black with, or without, a polymer emulsion and water, to form wet pellets, in a continuous pin pelletizer. The resultant wet pellets were dried at a temperature which was sufficient to remove the water without causing decomposition of the polymer. In these experiments, drying temperatures in the range of 120° to 180° C. were found to be acceptable.

The ester polymer emulsions utilized were VINNAPAS LL 462 ethylene, vinyl acetate copolymer emulsion and VINNAPAS EAF 60 ethylene, vinyl acetate, acrylate emulsion having the properties described in Example 1.

The polymer compositions were produced by combining dry carbon black, with and without polymeric treating agent, using a Banbury mixer, with EL VAX EVA resins to produce compositions containing 40% by weight, based on the weight of the composition, carbon black, 0.5% by weight, based on the weight of the composition, of AGERITE MA antioxidant, 1.0% by weight, based on the weight of the composition, of VUL-CUP R peroxide curing agent; the remainder being EVA resin and binder. The mixing temperature was maintained below 150° C. to minimize premature cure of the compound.

The polymer compositions were extruded, utilizing a single screw extruder fitted with a slit die, to produce tapes. The surface of the tape was examined and the area of undispensed carbon black measured utilizing the test procedure described above. The results are provided in Table 4 below.

TABLE 4

Dispersion Characteristics

| Composition | VINNAPAS Polymer Emulsion Grade | %, by weight of polymer emulsion | %, undispersed carbon black |
| --- | --- | --- | --- |
| MM | none | 0 | 0.009694 |
| NN | LL 462 | 2 | 0.007033 |
| OO | EAF 60 | 2 | 0.004101 |
| PP | EAF 60 | 6.7 | 0.004219 |
| QQ | EAF 60 | 10 | 0.007274 |

These results illustrate that extruded polymer compositions NN, OO, PP and QQ produced utilizing a treated carbon black composition prepared with an ester polymer treating agent have a reduced percentage of undispersed carbon black in comparison to polymer composition MM, a similar extruded polymer composition produced with an untreated carbon black. One of ordinary skill in the art would expect that the improvement in dispersion quality will allow a fabricator to produce an improved extruded article.

It should be clearly understood that the forms of the present invention herein described are illustrative only and are not intended to limit the scope of the invention.

What is claimed is:

1. A treated carbonaceous composition comprising:
   a carbonaceous material treated in the presence of water with at least one ester polymer treating agent to produce a treated carbonaceous material, the ester polymer treating agent being 0.5% to 20% by weight of the treated carbonaceous material and comprising monomer units from at least one of:
   i) vinyl alcohol, or an ester of vinyl alcohol and a carboxylic acid containing from 1 to 20 carbon atoms;
   ii) acrylic acia or a $C_1$–$C_8$ alkyl ester of acrylic acid; or
   iii) methacrylic acid or a $C_1$–$C_8$ alkyl ester of methacrylic acid.

2. The treated carbonaceous composition of claim 1 wherein the carbonaceous material is a carbon black.

3. The treated carbonaceous composition of claim 1 wherein the ester polymer treating agent further comprises: ethylene, an alpha olefin or a vinyl aromatic monomer.

4. The treated carbonaceous composition of claim 1 wherein the ester polymer treating agent is a polymer comprising ethylene and vinyl acetate.

5. The treated carbonaceous composition of claim 1 wherein the ester polymer treating agent is present in an amount of 0.5 to 10%, by weight, based on the weight of the treated carbonaceous material.

6. The treated carbonaceous composition of claim 5 wherein the ester polymer treating agent is present in an amount of 1 to 10%, by weight, based on the weight of the treated carbonaceous material.

7. The treated carbonaceous composition of claim 2 wherein the carbon black has an iodine number ($I_2$No.) of 10 to 1800 mg/g and a fluffy dibutyl phthalate absorption value (DBP) of 40 to 350.

8. A polymer composition comprising:
   a polymer component; and
   0.5 to 74% by weight, based on the weight of the polymer composition, of a treated carbonaceous composition comprising carbonaceous material treated in the presence of water with at least one ester polymer treating agent, the ester polymer treating agent being 0.5 to 20% by weight of the treated carbonaceous material and comprising monomer units from at least one of:
   (i) vinyl alcohol, or an ester of vinyl alcohol and a carboxylic acid containing from 1 to 20 carbon atoms;
   (ii) acrylic acid or a $C_1$–$C_8$ alkyl ester of acrylic acid; or
   (iii) methacrylic acid or a $C_1$–$C_8$ alkyl ester of methacrylic acid.

9. The polymer composition of claim 8 wherein the carbonaceous material is a carbon black.

10. The polymer composition of claim 8 wherein the polymer component comprises at least one of the following:
    a) propylene homopolymer, ethylene homopolymer, ethylene copolymer or graft polymer, wherein the ethylene copolymer or graft polymer comprises an ethylene monomer unit and a non-ethylene monomer unit, where the non-ethylene monomer unit comprises butene, hexene, propene, octene, vinyl acetate, acrylic acid, methacrylic acid, a $C_1$–$C_8$ alkyl ester of acrylic acid, a $C_1$–$C_8$ alkyl ester of methacrylic acid, maleic anhydride, half ester of maleic anhydride, carbon monoxide or a mixture of any of them;
    b) elastomer comprising: natural rubber, polybutadiene, polyisoprene, random styrene-butadiene rubber (SBR), polychloroprene, acrylonitrile-butadiene, ethylene-propylene co- and terpolymers; and
    c) homopolymer or copolymer of styrene, including styrene-butadiene-styrene linear and radial polymer, acrylonitrile-butadiene-styrene (ABS) and styrene-acrylonitrile (SAN).

11. The polymer composition of claim 8 comprising:
    22–55% by weight, based on the weight of the polymer composition, of the treated carbonaceous composition;
    0 to 2% by weight, based on the weight of the polymer composition, of a stabilizer;
    0 to 2% by weight, based on the weight of the polymer composition, of an antioxidant; and
    0 to 10% by weight, based on the weight of the polymer composition, of a crosslinking agent;
    wherein the polymer component comprises polymer selected from the group consisting of:
    a propylene homopolymer, ethylene polymerized with one or more alpha olefins, ethylene polymerized with propylene and a diene monomer and ethylene polymerized with one or more monomers selected from the group consisting of:
    vinyl acetate, methacrylic acid, $C_1$–$C_8$ alkyl esters of acrylic acid, $C_1$–$C_8$ alkyl esters of methacrylic acid, maleic anhydride, a monoester derived from fumaric or maleic acid, vinyl chloride, vinylidene chloride, and mixtures thereof.

12. The polymer composition of claim 11 wherein the carbonaceous material is a carbon black.

13. The polymer composition of claim 11 wherein the ester polymer treating agent is a polymer comprising ethylene and vinyl acetate.

14. The polymer composition of claim 11 wherein the ester polymer treating agent is present in an amount of 0.5 to 10%, by weight, based on the weight of the treated carbonaceous material.

15. The polymer composition of claim 14 wherein the ester polymer treating agent is present in an amount of 1 to 10%, by weight, based on the weight of the treated carbonaceous material.

16. The polymer composition of claim 11 wherein the crosslinking agent is selected from the group consisting of an organic peroxide; sulfur and a sulfur donor system.

17. The polymer composition of claim 16 wherein the crosslinking agent is an organic peroxide.

18. The polymer composition of claim 17 wherein the organic peroxide is dicumyl peroxide.

19. The polymer composition of claim 11 wherein the polymer component is ethylene-vinyl acetate.

20. The polymer composition of claim 19 wherein the ethylene-vinyl acetate contains 16–45%, by weight, of vinyl acetate, based on the weight of the ethylene-vinyl acetate.

21. The polymer composition of claim 11 wherein the polymer composition is semiconductive.

22. The polymer composition of claim 8 comprising:
   20–80% by weight, based on the weight of the polymer composition, of the treated carbonaceous composition; and
   wherein the polymer component comprises 80–20% by weight, based on the weight of the polymer composition, of at least one of the following: ethylene homopolymer or copolymer comprising an ethylene monomer unit and a non-ethylene monomer unit, where the non-ethylene monomer unit is selected from the group consisting of hexene, propene, butene, octene, vinyl acetate, methyl acrylate, ethyl acrylate, butyl acrylate, propylene homopolymer or copolymer, and styrene homopolymer or copolymer including styrene-butadiene-styrene linear and radial polymer, acrylonitrile-butadiene styrene (ABS) and styrene-acrylonitrile (SAN).

23. The polymer composition of claim 22 wherein the carbonaceous material is a carbon black.

24. The polymer composition of claim 22 wherein the ester polymer treating agent is a polymer comprising ethylene and vinyl acetate.

25. The polymer composition of claim 22 wherein the ester polymer treating agent is present in an amount of 0.5 to 10%, by weight, based on the weight of the treated carbonaceous composition.

26. The polymer composition of claim 25 wherein the ester polymer treating agent is present in an amount of 1 to 10%, by weight, based on the weight of the treated carbonaceous composition.

27. The treated carbonaceous composition according to claim 8 wherein the ester polymer treating agent is 0.5 to 10% by weight of the treated carbonaceous composition.

* * * * *